(12) United States Patent
Blok

(10) Patent No.: US 9,245,576 B2
(45) Date of Patent: Jan. 26, 2016

(54) METHOD FOR DETERMINING WHETHER A SAME DISC IS LOADED IN AN OPTICAL DRIVE

(75) Inventor: Rudi Blok, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1943 days.

(21) Appl. No.: 12/094,415

(22) PCT Filed: Nov. 17, 2006

(86) PCT No.: PCT/IB2006/054313
§ 371 (c)(1),
(2), (4) Date: May 21, 2008

(87) PCT Pub. No.: WO2007/057862
PCT Pub. Date: May 24, 2007

(65) Prior Publication Data
US 2008/0288970 A1    Nov. 20, 2008

(30) Foreign Application Priority Data
Nov. 21, 2005  (EP) .................................... 05300951

(51) Int. Cl.
*G11B 19/06*    (2006.01)
(52) U.S. Cl.
CPC ...................................... *G11B 19/06* (2013.01)
(58) Field of Classification Search
CPC ............... G11B 27/329; G11B 27/034; G11B 2220/20; G11B 27/105; G11B 20/1426; G11B 17/051

USPC ................................... 720/602, 606, 626, 645
See application file for complete search history.

(56) References Cited

U.S. PATENT DOCUMENTS

| | | | |
|---|---|---|---|
| 4,995,027 A * | 2/1991 | Aoyagi et al. ................ | 720/626 |
| 5,136,570 A * | 8/1992 | Takai et al. .................... | 720/624 |
| 5,239,426 A | 8/1993 | Sakaegi | |
| 5,243,475 A * | 9/1993 | Odashima et al. .............. | 360/71 |
| 5,392,269 A | 2/1995 | Horie | |
| 5,473,589 A * | 12/1995 | Horie .......................... | 369/53.37 |
| 5,974,016 A | 10/1999 | Andrews et al. | |
| 6,101,157 A * | 8/2000 | Bradshaw et al. .......... | 369/44.35 |
| 6,243,347 B1 * | 6/2001 | Kawana et al. ............... | 720/646 |
| 6,515,951 B1 * | 2/2003 | Oh ............................. | 369/53.37 |
| 7,164,636 B2 * | 1/2007 | Ijtsma et al. ............... | 369/47.53 |
| 7,484,026 B2 * | 1/2009 | Burnham et al. ............. | 710/303 |
| 2005/0126006 A1 * | 6/2005 | Kuo et al. ....................... | 30/27 |
| 2005/0188388 A1 * | 8/2005 | Fujinaga ....................... | 720/606 |
| 2005/0204373 A1 * | 9/2005 | Ueno et al. .................... | 720/616 |
| 2006/0257105 A1 * | 11/2006 | Ninomiya ....................... | 386/95 |

FOREIGN PATENT DOCUMENTS

EP            0177232 A2    4/1986

* cited by examiner

*Primary Examiner* — Adam B Dravininkas

(57) ABSTRACT

The invention relates to a method for determining whether a same disc is loaded in an optical drive. The method comprises the steps of measuring a time interval between a disc insertion event resulting from a disc insertion command and a disc ejection event resulting from a disc ejection command, comparing the time interval with a predefined value, and indicating that the same disc is loaded in the optical disc if the time interval is smaller than the predefined value.

8 Claims, 1 Drawing Sheet

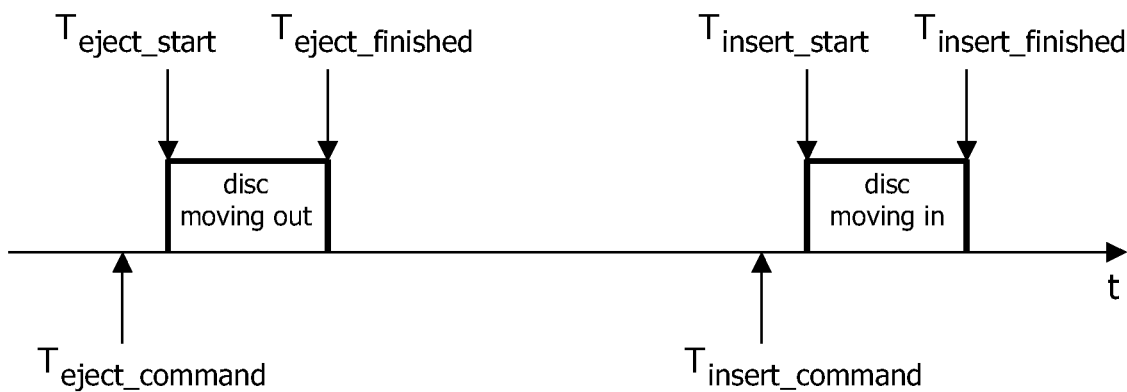

METHOD FOR DETERMINING WHETHER A SAME DISC IS LOADED IN AN OPTICAL DRIVE

FIELD OF THE INVENTION

The present invention relates to a method for determining whether a same disc is loaded in an optical drive.

BACKGROUND OF THE INVENTION

When a disc is loaded in an optical drive, by means of a tray or not, the first step to be performed is to recognize the disc present in the drive.

The disc recognition procedure involves operations which namely consist of selection of a laser (CD, DVD or BluRay laser) to start disc recognition by way of a substrate thickness measurement, reflection measurement at non-rotating disc, spherical aberration control during disc recognition and initializations, presets, and calibrations of various items such as focus offset, radial tilt, tangential tilt and spherical aberration.

Performing all these operations actually takes a significant amount of time. As timing performance is an important property of an optical drive, the duration and/or number of operations mentioned above should be kept to a minimum.

On the other hand, it is apparent that time could be saved in circumstances where a same disc is still present in the optical drive although the user has given an ejection command but without changing the current disc.

Indeed, under those circumstances, several operations may be skipped such as substrate thickness measurement for selecting the correct laser, spherical aberration adjustment, and radial tilt calibration.

Thus, it can be readily understood that determining whether a same disc is still present in an optical drive may be of the upper importance in assessing the timing performance of an optical drive.

In that context, U.S. Pat. No. 5,974,016 discloses a disc drive equipped with an automatic closing tray wherein a delay is set before the tray is closed, said delay depending on the presence in the tray of an old or a new disc or if the tray is empty. For that purpose, a plurality of sensors at a nest in the tray senses the presence of a disc in the nest and also whether the disc is correctly positioned.

However, it will be appreciated that providing an optical drive with sensors specially dedicated to the determination that a same disc is still present in the drive results in additional costs and technical complexity that are generally hoped to be saved.

SUMMARY OF THE INVENTION

It is an object of the invention to provide a method for determining whether a same disc is loaded in an optical drive which would be simpler to carry out that the known above-mentioned solution.

To this end, the invention proposes a method for determining whether a same disc is loaded in an optical drive, said method comprising a step of measuring a time interval between a disc insertion event resulting from a disc insertion command and a disc ejection event resulting from a disc ejection command, and a step of comparing said time interval with a predefined value, wherein said disc is meant as still loaded in said optical drive if said time interval is smaller than said predefined value.

Said predefined value corresponds to the time needed for a user to exchange a disc in the optical drive. Therefore, if said time interval is actually smaller than said predefined value, one can assume that the user did not have enough time to exchange the disc and the same disc is still loaded.

As a consequence, since it is determined by virtue of the method in accordance with the invention that the same disc is loaded, the optical drive can re-use some of the disc settings resulting of disc recognition operations previously performed for the same disc, as selection of the correct laser, spherical aberration measurement, radial tilt calibration.

According to various embodiments of the invention, the disc insertion event is the disc insertion command or a disc insertion start or a disc insertion completion and the disc ejection event is the disc ejection command or a disc ejection start or a disc ejection completion.

The invention also relates to an optical drive comprising means for determining whether a same disc is loaded in said optical drive, said optical drive comprising means for measuring a time interval between a disc insertion event resulting from a disc insertion command and a disc ejection event resulting from a disc ejection command, and means for comparing said time interval with a predefined value, said disc being meant as still loaded in said optical drive if said time interval is smaller than said predefined value.

The invention also relates to a computer program for performing the steps of the method in accordance with the invention.

In addition, it is to be noted that the invention can be used in all optical drives should they be equipped with a moving tray or not.

These and other aspects of the invention will be apparent from and will be elucidated with reference to the embodiments described hereinafter.

BRIEF DESCRIPTION OF THE DRAWING

The invention will now be described in more detail by way of example with reference to the accompanying drawing:

FIG. 1 is a chronogram showing the different stages of the motion of a disc in an optical drive.

DETAILED DESCRIPTION OF THE INVENTION

As shown in FIG. 1, the ejection of a disc in an optical drive starts with an eject_command given at time $T_{eject\_command}$ by the user of the optical drive. At the same time or after a short delay, the disc starts being ejected at time $T_{eject\_start}$.

Ejection of the disc ends at time $T_{eject\_finished}$. The duration of the ejection phase is equal to $TT_{eject\_finished} - T_{eject\_start}$ and depends on the manufacturer of the drive.

The drive remains in an ejection position until the user gives an insert_command at time $T_{insert\_command}$ after having taken the disc out of the drive or not. The insertion phase starts at time $T_{insert\_start}$, a short delay or not after $T_{insert\_command}$, ends at time $T_{insert\_finished}$ and thus lasts during time interval $T_{insert\_finished} - T_{insert\_start}$, depending on the manufacturer of the drive.

In order to determine whether the same disc is still in the optical drive at time $T_{insert\_command}$ when the insert_command is given by the user, the invention states that the same disc is still in the optical drive if said insert_command was given shortly after an event took place resulting from an eject_command, i.e after a time interval smaller than a predefined value.

In practice, the relevant time interval can be defined as $T_{insert\_command} - T_{eject\_finished}$ calculated after ejection is completed. Typically, one may assume that if this time interval is smaller than about 0.5 second the same disc is still in the drive and is being re-inserted, with all the advantageous consequences about the disc recognition operations which are substantially simplified as above explained.

The relevant time interval to be considered can be otherwise defined. For example, its origin may be taken at either $T_{eject\_command}$ or $T_{eject\_start}$ which make it possible to account for an insert_command given before ejection is completed. Likewise, the termination of said relevant time interval may be taken as $T_{insert\_start}$ or $T_{insert\_finished}$. Naturally, in those cases, the predifined reference value should be calculated accordingly.

The invention claimed is:

1. A method for determining whether a same disc is loaded in an optical drive, said method comprising:
    detecting a first event corresponding to a disc ejection event;
    detecting a second event corresponding to a disc insertion event;
    calculating a time interval between the disc insertion event and the disc ejection event,
    comparing said time interval with a predefined value,
    determining said same disc is loaded in said optical drive if said time interval is smaller than said predefined value; and
    re-using at least one disc setting resulting from a prior disc recognition operation in accessing said same disc when said same disc is determined to be loaded.

2. The method as claimed in claim 1, wherein said disc insertion event is a disc insertion command.

3. The method as claimed in claim 1, wherein said disc insertion event is a disc insertion start.

4. The method as claimed in claim 1, wherein said disc insertion event is a disc insertion completion.

5. The method as claimed in claim 1, wherein said disc ejection event is said disc ejection command.

6. The method as claimed in claim 1, wherein said disc ejection event is a disc ejection start.

7. The method as claimed in claim 1, wherein said disc ejection event is a disc ejection completion.

8. An optical drive comprising:
    means for first detecting a disc ejection event;
    means for next detecting a disc insertion event;
    means for calculating a time interval between the disc insertion event resulting and the disc ejection event, and
    means for comparing said time interval with a predefined value, and
    means for determining a same disc is loaded in said optical drive if said time interval is smaller than said predefined value; and
    means for re-using at least one disc setting resulting from a prior disc recognition operation in accessing said same disc when said same disc is determined to be loaded.

* * * * *